United States Patent
Dinan et al.

(10) Patent No.: US 11,188,394 B2
(45) Date of Patent: Nov. 30, 2021

(54) TECHNOLOGIES FOR SYNCHRONIZING TRIGGERED OPERATIONS

(71) Applicant: Intel Corporation, Santa Clara, CA (US)

(72) Inventors: James Dinan, Hudson, MA (US); Mario Flajslik, Hopkinton, MA (US); Timo Schneider, Hudson, MA (US); Keith D. Underwood, Powell, TX (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 15/941,984

(22) Filed: Mar. 30, 2018

(65) Prior Publication Data

US 2019/0050274 A1 Feb. 14, 2019

(51) Int. Cl.
*G06F 9/46* (2006.01)
*G06F 9/52* (2006.01)

(52) U.S. Cl.
CPC ..................... *G06F 9/52* (2013.01)

(58) Field of Classification Search
CPC .......................................................... G06F 9/52
See application file for complete search history.

(56) References Cited

U.S. PATENT DOCUMENTS

2016/0149819 A1 5/2016 Hussain et al.
2016/0381120 A1 12/2016 Flajslik et al.
2018/0287954 A1 10/2018 Dinan et al.

OTHER PUBLICATIONS

First Office Action for U.S. Appl. No. 15/859,389, dated Apr. 12, 2021, 9 pages.
First Office Action for U.S. Appl. No. 15/941,509, dated May 6, 2021, 9 pages.
"Fabric Collective Accelerator (FCA)" Mellanox Technologies, www.mellanox.com, 2014, 2 pages.
"Bull eXascale Interconnect for HPC Systems", Oct. 2017, downloaded from https://atos.net/wp-content/uploads/2017/10/W-BXI-en1-web-1.pdf on Mar. 4, 2021, 12 pages.
"Libfabric OpenFabrics", downloaded from http://web.archive.org/web/20170313110849/https:/ofiwg.github.io/libfabric/ on Mar. 9, 2021.

(Continued)

*Primary Examiner* — Gregory A Kessler
(74) *Attorney, Agent, or Firm* — Compass IP Law, PC (57) ABSTRACT

Technologies for synchronizing triggered operations include a host fabric interface (HFI) of a compute device configured to receive an operation execution command associated with a triggered operation that has been fired and determine whether the operation execution command includes an instruction to update a table entry of a table managed by the HFI. Additionally, the HFI is configured to issue, in response to a determination that the operation execution command includes the instruction to update the table entry, a triggered list enable (TLE) operation and a triggered list disable (TLD) operation to a table manager of the HFI and disable a corresponding table entry in response to the TLD operation having been triggered, the identified table entry. The HFI is further configured to execute one or more command operations associated with the received operation execution command and re-enable, in response to the TLE operation having been triggered, the table entry. Other embodiments are described herein.

21 Claims, 5 Drawing Sheets

(56) References Cited

OTHER PUBLICATIONS

Barrett et al, "Using Triggered Operations to Offload Rendezvous Messages," Sandia National Laboratories, Sep. 2011, 8 pages.

Barrett et al, "The Portals 4.1 Network Programming Interface," Sandia National Laboratories Report, No. SAND2017-3825. Apr. 2017.

Flajslik et al., "On the Fence: An Offload Approach to Ordering One-Sided Communication," 2015 9th International Conference on Partitioned Global Address Space Programming Models, 2015, 12 pages.

Larkins et al., "Extending a Message Passing Runtime to Support Partitioned, Global Logical Address Spaces," COMHPC'16, IEEE, Nov. 2016, 7 pages.

Schneider et al., "Fast Networks and Slow Memories: A Mechanism for Mitigating Bandwidth Mismatches," 2017 IEEE 25th Annual Symposium on High-Performance Interconnects (HOTI), Aug. 28-30, 2017, 8 pages.

Schneider et al., "Protocols for Fully Offloaded Collective Operations on Accelerated Network Adapters," Parallel Processing (ICPP), 2013 42nd International Conference, Oct. 2013, 11 pages.

TECHNOLOGIES FOR SYNCHRONIZING TRIGGERED OPERATIONS

STATEMENT REGARDING FEDERALLY SPONSORED RESEARCH

This invention was made with Government support under contract number H98230A-13-D-0124 awarded by the Department of Defense. The Government has certain rights in this invention.

BACKGROUND

Many high-performance computing (HPC) and datacenter applications are network latency sensitive with respect to the overall performance of the respective applications being executed thereon. One significant latency factor is the amount of time it takes to receive a response after posting a request. Oftentimes, the processing required to service the request is minimal. For example, simply receiving the response to the request in some collective communication patterns (e.g., tree-based barrier) could be sufficient to trigger a response. Accordingly, to enable applications to perform application-level offloading of communication patterns, host fabric interfaces (HFIs) typically rely on triggered operations, which are supported by various networking application programming interfaces (APIs), such as Portals (e.g., Portals 4 API), OpenFabrics Interfaces (OFI) libfabric, etc. Triggered operations are communication operations that are issued by the application and will be performed when a future communication event occurs. For example, a broadcast operation may be offloaded by issuing triggered operations which can be fired upon a future communication event having been detected, at which time data can be forwarded to the intended recipient. Further, by linking multiple triggered operations through sequences of events, it is possible to offload programs to the HFI.

However, various limitations exist in present implementations. For example, present triggered operation engines do not typically provide operations which can be used to synchronize triggered updates to offload engine state with the processing of incoming messages or commands. As such, message processing on a target match list (e.g., of a table entry of a Portals 4 table) remains unsynchronized. Accordingly, the processing of an incoming message or host-initiated command can be interleaved with triggered state updates, which can result in incorrect behavior of the triggered offload program.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
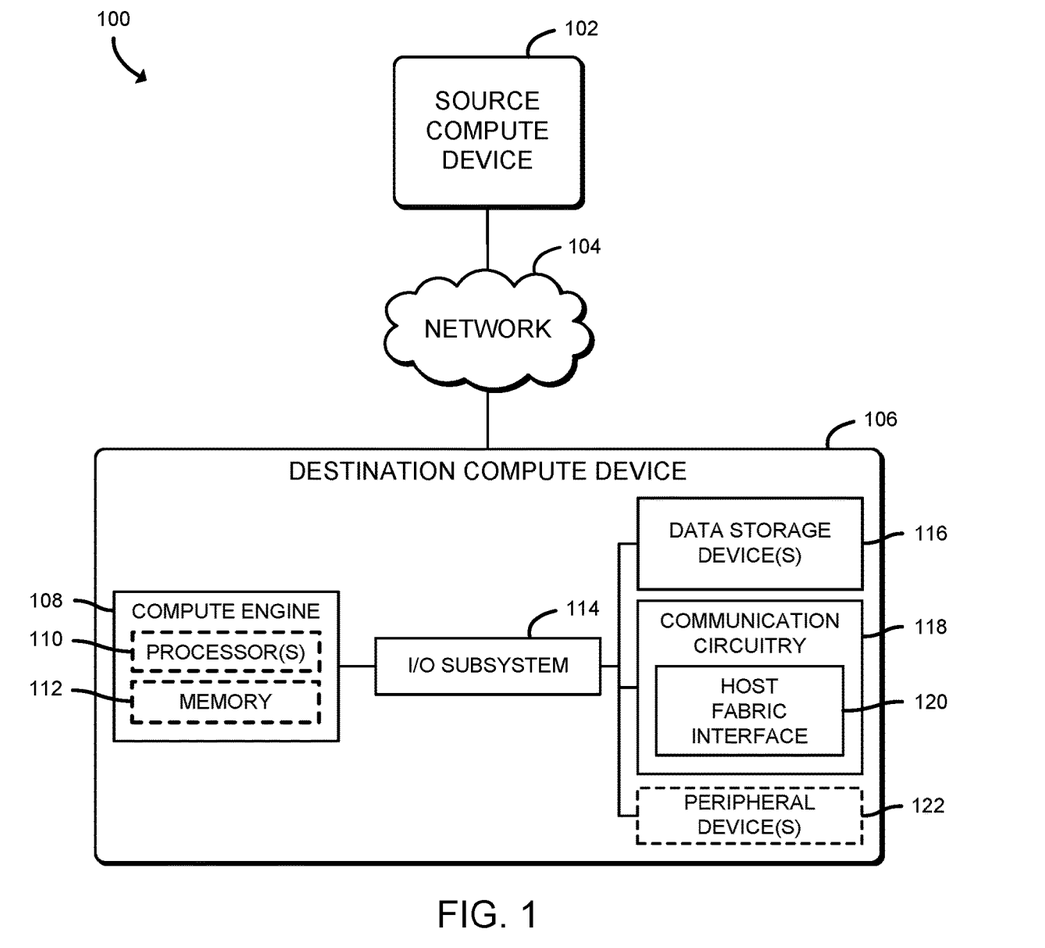
FIG. 1 is a simplified block diagram of at least one embodiment of a system for synchronizing triggered operations that includes a source compute device and a destination compute device communicatively coupled via a network.

Referring now to FIG. 1, in an illustrative embodiment, a system 100 for synchronizing triggered operations includes a source compute device 102 communicatively coupled to a destination compute device 106 via a network 104. While illustratively shown as having a single source compute device 102 and a single destination compute device 106, the system 100 may include multiple source compute devices 102 and multiple destination compute devices 106, in other embodiments. It should be appreciated that the source compute device 102 and destination compute device 106 have been illustratively designated herein as being one of a "source" and a "destination" for the purposes of providing clarity to the description and that the source compute device 102 and/or the destination compute device 106 may be capable of performing the functions described herein. It should be further appreciated that the source compute device 102 and the destination compute device 106 may reside in the same data center or high-performance computing (HPC) environment. In other words, the source compute device 102 and destination compute device 106 may reside in the same network 104 connected via one or more wired interconnects.

In use, the source compute device 102 and the destination compute device 106 transmit and receive network traffic (e.g., network packets, frames, etc.) to/from each other. Oftentimes, such communications are latency sensitive such that the overall performance of the application in particular environments depends on the amount of time it takes to receive a response to a transmitted network packet. For example, the destination compute device 106 may receive a network packet from the source compute device 102. Upon receipt of a network packet, the destination compute device 106 typically identifies how to process the network packet. To do so, the destination compute device 106 generally relies on one or more instructions previously received from an application which are usable to determine how to process the network packet in order to retrieve/process data associated with the network packet (e.g., the payload of the network packet, an indication of receipt of the network packet, etc.). Such processing of the network packet can include application-level offloading of communication patterns associated with the network packet to the network interface of the destination compute device 106. The offloading of such communication patterns (i.e., onto the network interface) can reduce many of the latencies which are inherent in network communications and, consequently, reduce the amount of time taken to perform the offloaded operations.

To manage the timing of the offload operations, the application may rely on one or more hardware-supported triggered operations, each of which are associated with a triggering event (e.g., a network communication related event, a network packet processing event, etc.). Triggered operations include operations which are issued by an application and will be performed when a future event or series of events occur. For example, a triggered operation may be a communication operation issued by the application that is to be performed upon the detected occurrence of a future communication event or a series of communication events. In an illustrative example, a broadcast operation can be offloaded by issuing triggered operations that will be fired and forward data after the message has been received (e.g., from a parent node in a broadcast tree). Oftentimes, the amount of processing required to service a particular request is minimal. For example, the processing required to service the request may be prompted by having received the network packet, as in some collective communication patterns (e.g., tree-based communication patterns), or a processing condition/action associated therewith.

In use, the triggered operation may update a list entry (e.g., a match list entry) in a list (e.g., a matching list entry) of a table entry in a table of entries. In an illustrative example using Portals, the triggered operation may update a list entry in a priority list, an overflow list, etc., of a Portals table entry (PTE) in a matching or non-matching Portals table. To update a list entry, unlike present technologies in which triggered operations (e.g., TriggeredMEUnlink and TriggeredMEAppend) are performed atomically with respect to other accesses to the table entry, the destination compute device 106 is configured to integrate two new triggered operations: a triggered list enable (TLE) operation and a triggered list disable (TLD) operation. The TLE and TLD operations can be integrated with existing event counters, which, as noted previously, are incremented upon successful completion of a triggered operation and are used as triggers for subsequent triggered operations (i.e., when a triggered operation's corresponding counter value matches an associated event counter). Upon being triggered, a TLE/TLD operation enables/disables accesses to a given table entry (e.g., a matching list).

Each list entry in a list of a table entry is additionally configured to include a match-and-disable list (MDL) flag, or bit, which can be used to atomically disable the table entry (i.e., in which the list entry resides). The MDL flags are set by an application (i.e., for which corresponding resources have been allocated) on a match list entry and consumed by the destination compute device 106, or more particularly by a host fabric interface (HFI) 120 of the destination compute device 106, when processing an incoming message/network packet. In other words, the MDL flag is handled in the part of the destination compute device 106 architecture that processes incoming messages/network packets. When an incoming message matches a match list entry with the MDL flag set, the HFI 120 is configured to disable the corresponding table entry before any subsequent traversal of the list (i.e., atomically). Once a table entry is disabled as a result of an MDL action, when messages targeting that table entry are received, the HFI 120 is configured to respond to such access requests to that table entry with a receiver-not-ready (RNR) response. Accordingly, such a table entry disabling approach ensures that no additional buffering requirements are placed on the HFI. Instead, the sender (e.g., the source computing device 102) can resend the message/network packet at a future point in time.

It should be appreciated that the MDL is distinct from the processes which manage the TLE/TLD operations, which are handled by the part of the destination compute device 106 architecture that process events and issue commands. However, the MDL flag functionality, in combination with a TLE operation can be used to synchronize updates to a matching list of a table entry, for example, when a match of a matching list entry triggers operations that update the matching list or update list entries contained within the matching list. It should be appreciated that the TLE/TLD operations and MDL operations can be defined to target various resources, such as table entries of a table, matching list entries of a list (e.g., a matching list) of a table entry, logical networking interfaces, etc.

The destination compute device 106 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced network interface controller (NIC) (e.g., a HFI), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

As shown in FIG. 1, the illustrative destination compute device 106 includes a compute engine 108, an I/O subsystem 114, one or more data storage devices 116, communication circuitry 118, and, in some embodiments, one or more peripheral devices 122. It should be appreciated that the destination compute device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may be embodied as, one or more processors 110 (i.e., one or more central processing units (CPUs)) and memory 112.

The processor(s) 110 may be embodied as any type of processor capable of performing the functions described herein. For example, the processor(s) 110 may be embodied as one or more single-core processors, one or more multi-core processors, a digital signal processor, a microcontroller, or other processor or processing/controlling circuit(s). In some embodiments, the processor(s) 110 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 112 may be embodied as any type of volatile (e.g., dynamic random access memory (DRAM), etc.) or non-volatile memory or data storage capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the destination compute device 106 via the I/O subsystem 114, which may be embodied as circuitry and/or components to facilitate input/output operations with the processor 110, the memory 112, and other components of the destination compute device 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a system-on-a-chip (SoC) and be incorporated, along with one or more of the processor 110, the memory 112, and other components of the destination compute device 106, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the destination compute device 106 and other computing devices, such as the source compute device 102, as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication. It should be appreciated that, in some embodiments, the communication circuitry 118 may include specialized circuitry, hardware, or combination thereof to perform pipeline logic (e.g., hardware algorithms) for performing the functions described herein, including processing network packets, performing computational functions, etc.

In some embodiments, performance of one or more of the functions of communication circuitry 118 as described herein may be performed by specialized circuitry, hardware, or combination thereof of the communication circuitry 118, which may be embodied as a system-on-a-chip (SoC) or otherwise form a portion of a SoC of the destination compute device 106 (e.g., incorporated on a single integrated circuit chip along with a processor 110, the memory 112, and/or other components of the destination compute device 106). Alternatively, in some embodiments, the specialized circuitry, hardware, or combination thereof may be embodied as one or more discrete processing units of the destination compute device 106, each of which may be capable of performing one or more of the functions described herein.

The illustrative communication circuitry 118 includes an HFI 120, which may also be referred to as a network interface controller (NIC) or a smart NIC in some embodiments. The HFI 120 may be embodied as one or more add-in-boards, daughtercards, network interface cards, controller chips, chipsets, or other devices that may be used by the destination compute device 106 to connect with another compute device (e.g., the source compute device 102). In some embodiments, the HFI 120 may be embodied as part of a system-on-a-chip (SoC) that includes one or more processors, or included on a multichip package that also contains one or more processors. In some embodiments, the HFI 120 may include a local processor (not shown) and/or a local memory (not shown) that are both local to the HFI 120. In such embodiments, the local processor of the HFI 120 may be capable of performing one or more of the functions of a processor 110 described herein. Additionally or alternatively, in such embodiments, the local memory of the HFI 120 may be integrated into one or more components of the destination compute device 106 at the board level, socket level, chip level, and/or other levels.

The one or more peripheral devices 122 may include any type of device that is usable to input information into the destination compute device 106 and/or receive information from the destination compute device 106. The peripheral devices 122 may be embodied as any auxiliary device usable to input information into the destination compute device 106, such as a keyboard, a mouse, a microphone, a barcode reader, an image scanner, etc., or output information from the destination compute device 106, such as a display, a speaker, graphics circuitry, a printer, a projector, etc. It should be appreciated that, in some embodiments, one or more of the peripheral devices 122 may function as both an input device and an output device (e.g., a touchscreen display, a digitizer on top of a display screen, etc.). It should be further appreciated that the types of peripheral devices 122 connected to the destination compute device 106 may depend on, for example, the type and/or intended use of the destination compute device 106. Additionally or alternatively, in some embodiments, the peripheral devices 122 may include one or more ports, such as a USB port, for example, for connecting external peripheral devices to the destination compute device 106.

The source compute device 102 may be embodied as any type of computation or computer device capable of performing the functions described herein, including, without limitation, a mobile computing device (e.g., a smartphone, a tablet computer, a laptop computer, a notebook computer, a wearable, etc.), a desktop computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that source compute device 102 includes similar and/or like components to those of the illustrative destination compute device 106. As such, figures and descriptions of the like components are not repeated herein for clarity of the description with the understanding that the description of the corresponding components provided above in regard to the destination compute device 106 applies equally to the corresponding components of the source compute device 102. Of course, it should be appreciated that the computing devices (i.e., the source compute device 102 and/or the destination compute device 106) may include additional and/or alternative components, depending on the embodiment.

The network 104 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the destination compute device 106 and the source compute device 102, which are not shown to preserve clarity of the description.

Figure 2:
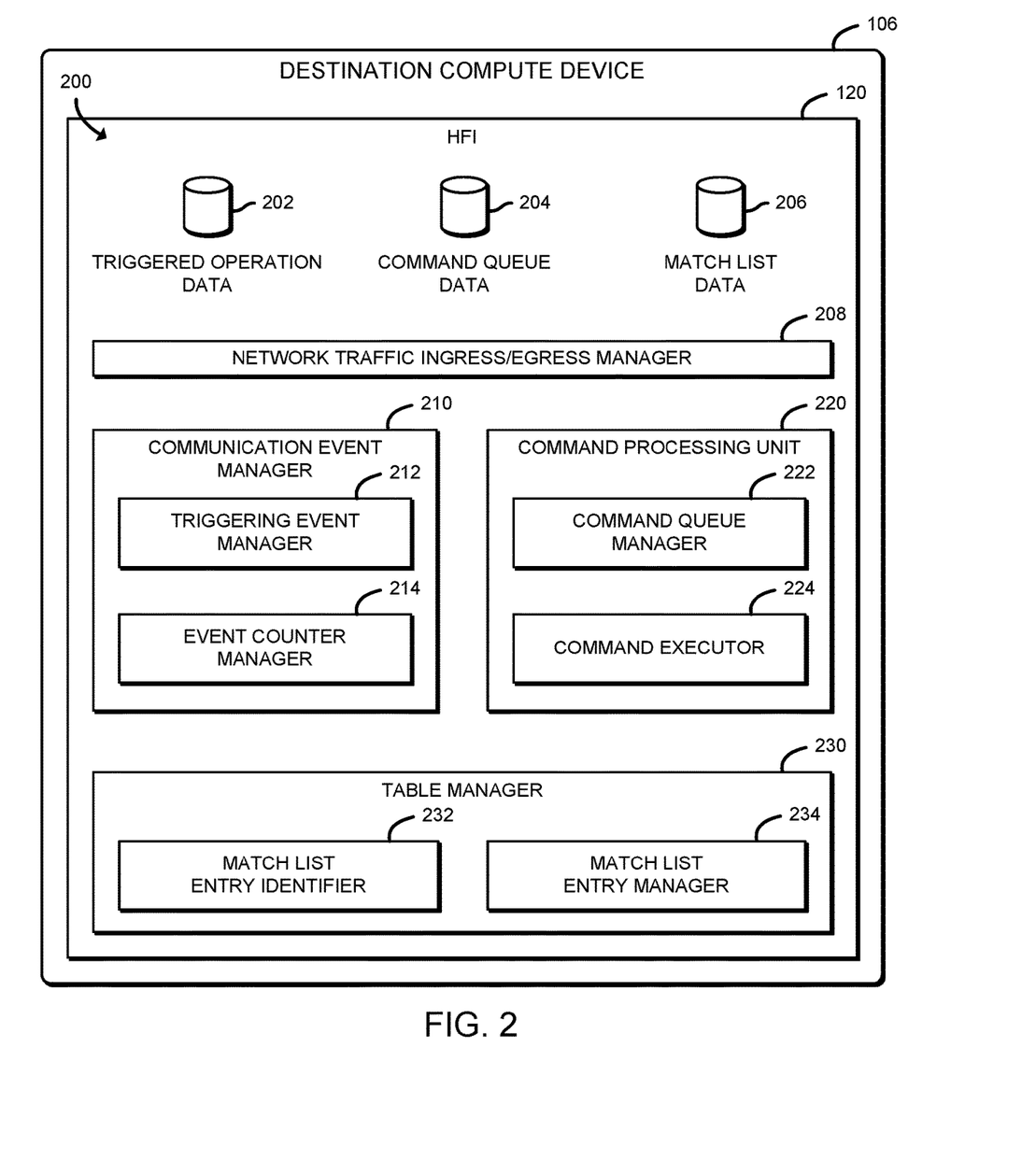
FIG. 2 is a simplified block diagram of at least one embodiment of an environment of the destination compute device of the system of FIG. 1.

Referring now to FIG. 2, in use, the destination compute device 106 establishes an environment 200 during operation. The illustrative environment 200 includes a network traffic ingress/egress manager 208, a communication event manager 210, a command processing unit 220, and a table manager 230. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 208, communication event management circuitry 210, command processing circuitry 220, table management circuitry 230, etc.).

As illustratively shown, the network traffic ingress/egress management circuitry 208, the communication event management circuitry 210, the command processing circuitry 220, and the table management circuitry 230 form a portion of the HFI 120. However, it should be appreciated that, in other embodiments, one or more functions of the network traffic ingress/egress management circuitry 208, the communication event management circuitry 210, the command processing circuitry 220, and the table management circuitry 230 as described herein may form a portion of one or more of the compute engine 108, the I/O subsystem 114, the communication circuitry 118, and/or other components of the destination compute device 106.

Additionally, in some embodiments, one or more of the illustrative components may form a portion of another component and/or one or more of the illustrative components may be independent of one another. For example, in some embodiments, the table manager 230 may form a portion of the communication event manager 210. Further, in some embodiments, one or more of the components of the environment 200 may be embodied as virtualized hardware components or emulated architecture, which may be established and maintained by the HFI 120, the compute engine 108, or other components of the destination compute device 106. It should be appreciated that the destination compute device 106 may include other components, sub-components, modules, sub-modules, logic, sub-logic, and/or devices commonly found in a computing device, which are not illustrated in FIG. 2 for clarity of the description.

In the illustrative environment 200, the destination compute device 106 additionally includes triggered operation data 202, command queue data 204, and match list data 206, each of which may be accessed by the various components and/or sub-components of the destination compute device 106. Additionally, it should be appreciated that in some embodiments the data stored in, or otherwise represented by, each of the triggered operation data 202, the command queue data 204, and the match list data 206 may not be mutually exclusive relative to each other. For example, in some implementations, data stored in the triggered operation data 202 may also be stored as a portion of one or more of the command queue data 204 and/or the match list data 206, or vice versa. As such, although the various data utilized by the destination compute device 106 is described herein as particular discrete data, such data may be combined, aggregated, and/or otherwise form portions of a single or multiple data sets, including duplicative copies, in other embodiments.

The network traffic ingress/egress manager 208, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 208 is configured to facilitate inbound network communications (e.g., network traffic, network packets, network flows, etc.) to the destination compute device 106. Accordingly, the network traffic ingress/egress manager 208 is configured to manage (e.g., create, modify, delete, etc.) connections to physical and virtual network ports (i.e., virtual network interfaces) of the destination compute device 106 (e.g., via the communication circuitry 118), as well as the ingress buffers/queues associated therewith. Additionally, the network traffic ingress/egress manager 208 is configured to facilitate outbound network communications (e.g., network traffic, network packet streams, network flows, etc.) from the destination compute device 106. To do so, the network traffic ingress/egress manager 208 is configured to manage (e.g., create, modify, delete, etc.) connections to physical and virtual network ports/interfaces of the destination compute device 106 (e.g., via the communication circuitry 118), as well as the egress buffers/queues associated therewith.

The communication event manager 210, which may be embodied as hardware, firmware, software, virtualized hardware, emulated architecture, and/or a combination thereof as discussed above, is configured to manage the relationship between triggered operations and received communication events. To do so, the illustrative communication event manager 210 includes a triggering event manager 212 and an event counter manager 214. The triggering event manager 212 is configured to manage a queue of pending triggered operations. For example, upon receipt of TLE and TLD operations, the triggering event manager 212 is configured to enqueue the TLE and TLD operations into the queue, such that they can be triggered in response to a corresponding event counter (e.g., managed by the event counter manager 214) having reached a predetermined count value associated with each of the TLE and TLD operations. Accordingly, the triggering event manager 212 is additionally configured to determine whether an event corresponds to, or is otherwise mapped to, a particular counter, and if so, notify the event counter manager 214.

The event counter manager 214 is configured to manage the event counters (i.e., increment the counters). To do so, the event counter manager 214 is configured to allocate and initialize the event counters (e.g., in response to a request received from a corresponding software application) and update the event counters (e.g., by an increment of one). In some embodiments, the event counter values and/or mapping information may be included in the triggered operation data 202. It should be appreciated that each of the triggering event manager 212 and the event counter manager 214 of the illustrative communication event manager 210 may be separately embodied as hardware, firmware, software, virtualized hardware, emulated architecture, and/or a combination thereof. For example, the triggering event manager 212 may be embodied as a hardware component, while the event counter manager 214 may be embodied as a virtualized hardware component or as some other combination of hardware, firmware, software, virtualized hardware, emulated architecture, and/or a combination thereof.

The command processing unit 220, which may be embodied as hardware, firmware, software, virtualized hardware, emulated architecture, and/or a combination thereof as discussed above, is configured to process the commands, or instructions, associated with a triggered operation that has been fired (e.g., such as may be received from the communication event manager 210) at a host interface of the HFI 120. Accordingly, it should be appreciated that such commands may be received from the host (e.g., via an interface between the HFI 120 and a processor 110 of the compute engine 108) or from a pending queue of triggered operations managed local to the HFI 120. To do so, the illustrative command processing unit 220 includes a command queue manager 222 and a command executor 224. The command queue manager 222 is configured to receive commands which indicate to the command processing unit 220 which processes are to be conducted on what data as a function of a triggered operation having been triggered. Upon receipt of each command, the command queue manager 222 is configured to queue the command into the applicable queue (e.g., relative to a priority of the command, a priority of the triggering event, the type of offload being performed as a function of the command, etc.). The command executor 224 is configured to either execute the commands (e.g., offloading command(s) to the appropriate accelerator, fetching/setting data, etc.). Accordingly, it should be appreciated that the HFI 120 includes one or more additional components capable of performing the operations associated with the executed commands (i.e., command operations), such as an FPGA, an offload agent, and/or some other resources capable of performing the functions described herein. In some embodiments, the command queue and/or information related thereto may be stored in the command queue data 204.

It should be appreciated that each of the command queue manager 222 and the command executor 224 of the illustrative command processing unit 220 may be separately embodied as hardware, firmware, software, virtualized hardware, emulated architecture, and/or a combination thereof. For example, the command queue manager 222 may be embodied as a hardware component, while the command executor 224 may be embodied as a virtualized hardware component or as some other combination of hardware, firmware, software, virtualized hardware, emulated architecture, and/or a combination thereof.

The table manager 230, which may be embodied as hardware, firmware, software, virtualized hardware, emulated architecture, and/or a combination thereof as discussed above, is configured to manage the table of table entries. To do so, the illustrative table manager 230 includes a match list entry identifier 232 and a match list entry manager 234. The match list entry identifier 232 is configured to identify a particular match list entry of a table entry in a matching table (see, e.g., an illustrative matching table 502 of FIGS. 5A-5C). It should be appreciated that each match list entry is usable to describe a corresponding memory region (e.g., using a base address and length) and some matching criteria (i.e., in the case of the match list entries as described herein). In some embodiments, the matching criteria may be formatted as a set of "match" bits usable to identify a match list entry from a table entry of a matching table. The match list entry identifier 232 is configured to identify the match list entry as a function of a table entry identifier, which is usable to identify a table entry (e.g., via an associated index) and use the matching criteria to identify a match list entry of a matching list from the identified table entry. To do so, the match list entry identifier 232 may be configured to walk a match list of the matching list to find a matching match list entry (e.g., based on the requested source, match bits, etc.).

The match list entry manager 234 is configured to manage the data associated with each match list entry, as well as the match bits of each match list entry, and perform read/write operations thereon. For example, the match list entry manager 234 is configured to copy or append data to a match list entry upon having identified a matching match list entry. The match list entry manager 234 is further configured to retrieve data from each match list entry and store the retrieved in another location as requested by the requesting source. In some embodiments, the match list entry manager 234 may be configured to remove the matched list entry from the table entry upon being copied to another location, while in other embodiments the matched list entry may be persistent.

Additionally, the match list entry manager 234 is configured to manage an enabled state (i.e., enabled or disabled) of the table entries of the matching table associated with the respective match list entries. To do so, the match list entry manager 234 is configured to promptly disable a table entry corresponding to a matched matching list entry whose MDL flag is set to disable the table entry in response to having matched a matching list entry in the table entry (e.g., as may be identified via the match list entry identifier 232). It should be appreciated that, in some embodiments, the match list entry manager 234 may be additionally or alternatively configured to update the enabled state of a match list entry of a table entry. In other words, the match list entry manager 234 is configured to enable/disable table entries and/or list entries of a particular table entry, depending on the embodiment. Additionally, the match list entry manager 234 is configured to disable table entries in response to a triggered list disable (TLD) operation and enable table entries in response to a triggered list enable (TLE) operation. Accordingly, while the MDL flag can be used to disable the table entry atomically, the MDL flag in combination with the TLE operation can be used to provide atomicity for self-modifying match list entries.

In use, the match list entry manager 234 is configured to is configured to resolve a race condition which exists between processing the next arriving message for the same table entry (i.e., matching list of the table entry) in which the matching match list entry is contained and delivering an event to the event counter which triggers the TLD operation, causes the TLD operation to be sent to a command processing unit (e.g., the command processing unit 220), and executes the TLD operation. Accordingly, unlike present technologies in which a race condition exists between the event counter being incremented and a match list entry being matched in which the HFI 120 may not process a disable request in time, when a match list entry with an MDL flag enabled is matched, the table entry can be atomically disabled the the match list entry manager 234. As such, when a table entry is disabled and a message is received for that table entry, the match list entry manager 234 is configured to issue a receiver-not-ready (RNR) response to any operations targeting the table entry such that no additional buffering requirements are placed on the HFI 120. Additionally, the sender can retry (e.g., using additional triggered operation(s)) at a future point in time. In other words, TLD/MDL and TLE operations can be used by the match list entry manager 234 to provide mutual exclusion per table entry, thereby enabling a match event to begin an atomic section where a sequence of triggered updates can be performed without any intervening accesses to that table entry. In some embodiments, information associated with the matching table, the table entries, and/or the match list entries may be stored in the match list data 206.

It should be appreciated that each of the match list entry identifier 232 and the match list entry manager 234 of the illustrative table manager 230 may be separately embodied as hardware, firmware, software, virtualized hardware, emulated architecture, and/or a combination thereof. For example, the match list entry identifier 232 may be embodied as a hardware component, while the match list entry manager 234 may be embodied as a virtualized hardware component or as some other combination of hardware, firmware, software, virtualized hardware, emulated architecture, and/or a combination thereof.

Figure 3:
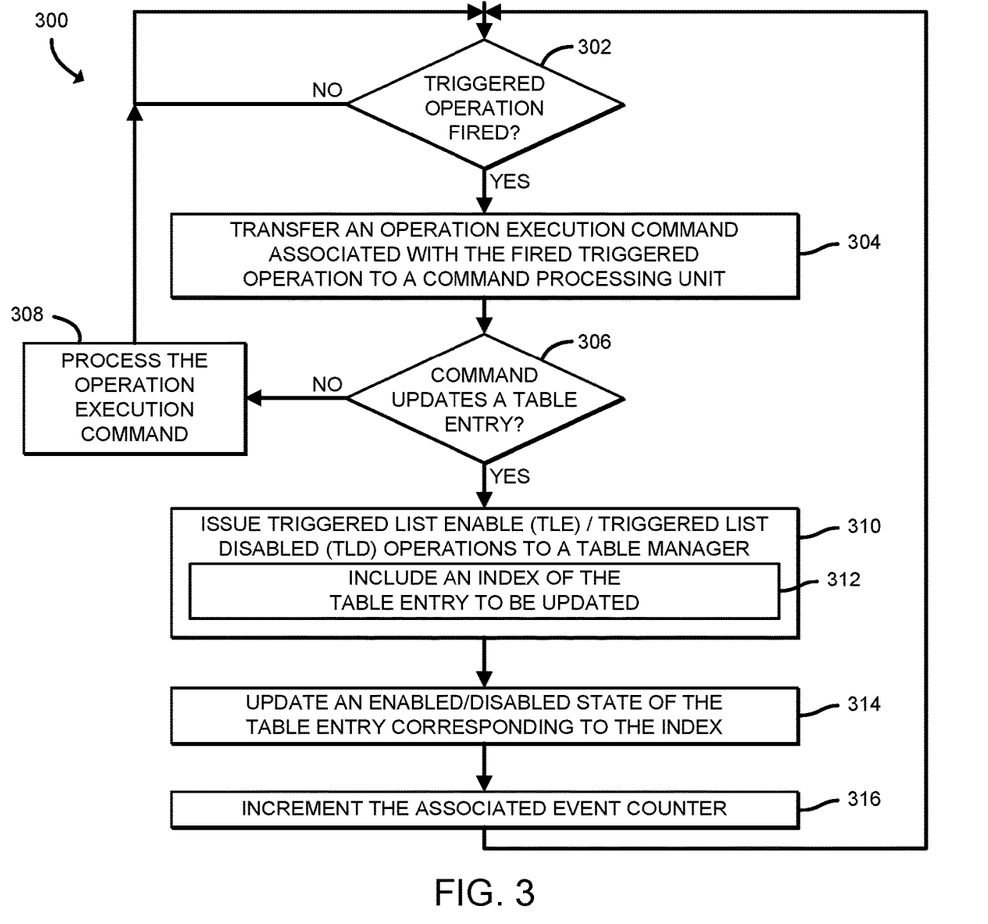
FIG. 3 is a simplified flow diagram of at least one embodiment of a method for synchronizing triggered operations using issued triggered list enable (TLE) and triggered list disable (TLE) operations that may be executed by the destination compute device of FIGS. 1 and 2.

Referring now to FIG. 3, a method 300 for synchronizing triggered operations using TLE/TLD operations is shown which may be executed by a compute device (e.g., the destination compute device 106 of FIGS. 1 and 2), or more particularly by an HFI of the compute device (e.g., the HFI 120 of FIG. 2). The method 300 begins with block 302, in which the HFI 120 determines whether a triggered operation has been fired, such as may result from an event counter value having matched a trigger threshold associated with the triggered operation. If so, the method 300 advances to block 304, in which the HFI 120 transfers an operation execution command to a command processing unit (e.g., the command processing unit 220 of FIG. 2) of the HFI 120. The operation execution command includes one or more commands associated with the fired triggered operation, which are to be performed as a result of the triggered operation having been fired.

In block 306, the HFI 120 determines whether the operation to be performed in response to the operation execution command involves updating a table entry. If not, the method 300 branches to block 308, in which the HFI 120 processes the operation execution command before the method returns to block 302 to determine whether another triggered operation has been fired. It should be appreciated that processing of the command execution and triggered operations may be implemented by different engines, or processors. Accordingly, it should be further appreciated that, in such embodiments, triggered operation processing may proceed independent of command execution and a queue may be established to buffer pending commands. Otherwise, if the HFI 120 determines that the operation to be performed in response to the operation execution command involves updating the table entry, the method 300 branches to block 310. In block 310, the HFI 120 issues TLE/TLD operations (e.g., via the command processing unit 220) to a table manager (e.g., the table manager 230 of FIG. 2) to enable/disable accesses to a given matching or non-matching table entry. Additionally, in block 312, the HFI 120 issues the TLE/TLD operations with an identifier (i.e., an index) of the table entry (e.g., based on at least a portion of the information contained in the operation execution command). In block 314, the HFI 120 updates an enabled state (i.e., enabled or disabled) of the table entry corresponding to the index. In block 316, the HFI 120 increments an event counter, thereby enabling the completion of the TLE/TLD operation to trigger a next operation in a sequence of triggered operations.

Figure 4:
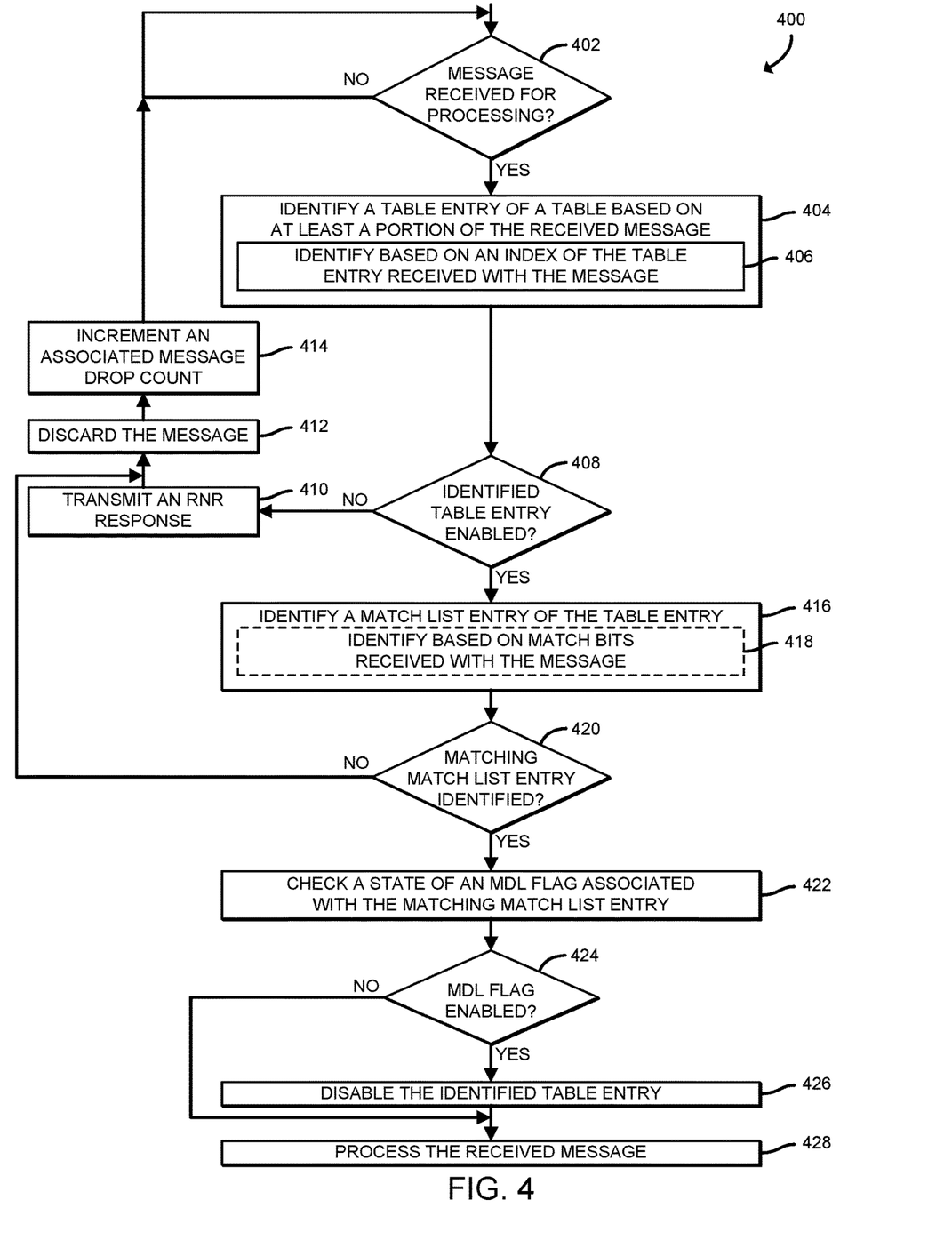
FIG. 4 is a simplified flow diagram of at least one embodiment of a method for synchronizing triggered operations using a match-and-disable flag that may be executed by the destination compute device of FIGS. 1 and 2.

Referring now to FIG. 4, a method 400 for synchronizing triggered operations using MDL flags is shown which may be executed by a compute device (e.g., the destination compute device 106 of FIGS. 1 and 2), or more particularly by an HFI of the compute device (e.g., the HFI 120 of FIG. 2). The method 400 begins with block 402, in which the HFI 120 determines whether a message has been received for processing by the HFI 120 (e.g., at a table manager of the HFI 120 as described above in the method 300 of FIG. 3) from the fabric or host interface of the HFI 120. If so, the method 400 advances to block 404, in which the HFI 120 identifies a table entry of a table (e.g., a matching table). To do so, in block 406, the HFI 120 may identify the table entry based on an index associated with the table entry (i.e., an index corresponding to a row in the table) received with the message.

In block 408, the HFI 120 determines whether the identified table entry is enabled. If the identified table entry is not enabled (i.e., is disabled), the method 400 branches to block 410, in which the HFI 120 transmits a receiver-not-ready (RNR) response to the sender of the message. As described previously, the identified table entry may have previously been disabled, such as by the HFI during message processing. For example, the identified table entry may include a match list entry whose MDL flag has been enabled (i.e., by an associated application) and the table entry has been disabled in response to processing a received network packet associated with the match list entry.

From block 410, the method 400 proceeds to block 412, in which the message is discarded. In block 414, the HFI 120 increments an associated message drop count before the method 400 returns to block 402 to determine whether another message has been received for processing. Referring back to block 408, if the HFI 120 determines that the identified table entry is enabled, the method advances to block 416. In block 416, the HFI 120 identifies a match list entry of the identified table entry. To identify the match list entry, in block 418, the HFI 120 may compare match bits of the received message with match bits of each match list entry (i.e., in a list of match list entries of the table entry).

In block 420, the HFI 120 determines whether a matching match list entry has been identified. If not, the method 400 branches to block 412, described previously; otherwise, the method 400 branches to block 422, in which the HFI 120 checks a state of the MDL flag associated with the identified matching match list entry. In block 424, the HFI 120 determines whether the state of the MDL flag indicates that the MDL flag is enabled (i.e., as previously specified by the application associated with the matching match list entry). If the HFI 120 determines that the state of the MDL flag indicates the MDL flag is enabled, the method 400 advances to block 426 to disable the identified table entry. Otherwise, the method 400 jumps to block 428, in which the HFI 120 processes the received message. It should be appreciated that during the processing of the received message, one or more triggered operations may be triggered, such that the triggered operations (e.g., a TLE operation) can be triggered in sequence (e.g., based on the associated event counter) and subsequent to a particular operation being performed.

In an illustrative example in which an MDL and TLE operation are used to enable a message queue offload, an incoming message is received by the HFI 120 in block 402 that includes a table entry index usable to identify a table entry of a matching table and match bits usable to identify a matching match list entry of the identified table entry whose MDL flag is enabled (i.e., set to disable the table entry upon a match list entry having been matched). Accordingly, the HFI 120 disables the identified table entry, which ensure that the message will be appended in order to the queue and that a subsequent pop will be able to retrieve the data (i.e., if the table entry is enabled at the time of the data retrieval attempt) or receive an RNR response (i.e., if the table entry is disabled at the time of the data retrieval attempt). In furtherance of the illustrative example, in which the matching event triggers a matching list entry append operation to append data of the message to the table entry, a subsequent TLE operation can be triggered, which re-enables the table entry.

Figure 5A:
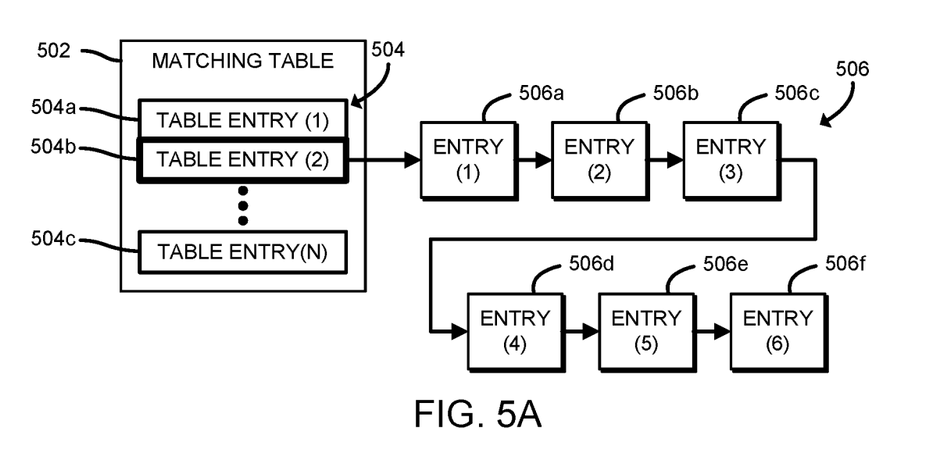
FIGS. 5A-5C are a simplified block diagram of at least one embodiment of match list entries of a match list for managing the synchronization of triggered operations that may be executed by the destination compute device of FIGS. 1 and 2.
Figure 5B:
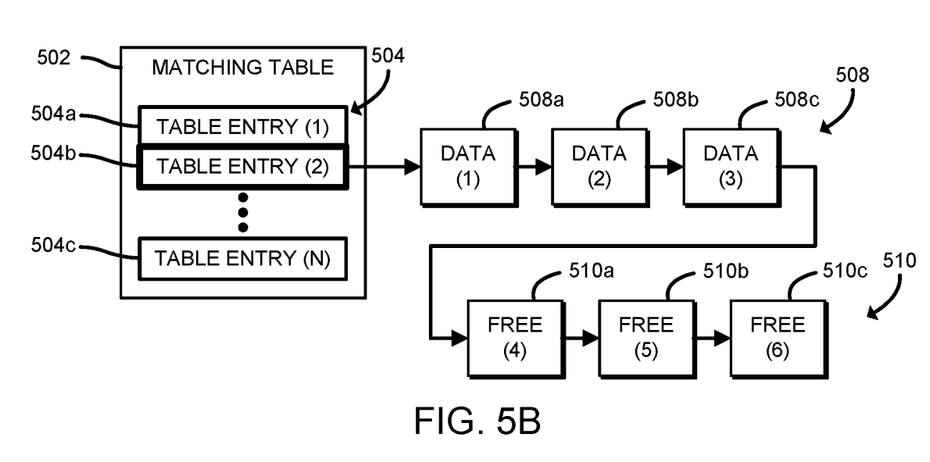
Figure 5C:
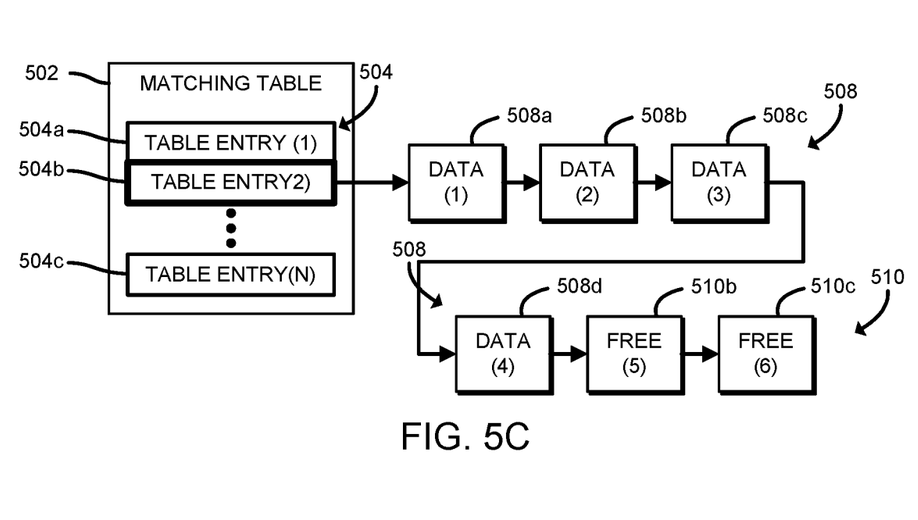

Referring now to FIGS. 5A-5C, an illustrative set of table entries 504 of a matching table 502 is illustratively shown. The table entries 504 illustratively includes a first table entry, designated as table entry (1) 504a, a second table entry, designated as table entry (2) 504b, and a third table entry, designated as table entry (N) 504c (e.g., wherein table entry (N) 504c designates the "Nth" table entry 504 and "N" is a positive integer). While it should be appreciated that each of the table entry 504 includes a list of one or more match list entries (e.g., accessible by an associated index), as illustratively shown in FIG. 5A, the table entry (2) 504b includes six match list entries 506 for six corresponding buffers. The match list entries 506 illustratively includes a first match list entry, designated as match list entry (1) 506a, a second match list entry, designated as match list entry (2) 506b, a third match list entry, designated as match list entry (3) 506c, a fourth match list entry, designated as match list entry (4) 506d, a fifth match list entry, designated as match list entry (5) 506e, and a sixth match list entry, designated as match list entry (6) 506f.

FIGS. 5B and 5C illustratively display an example usage of MDL and TLE to enable offload of first-in-first-out (FIFO) message queues used for publish/subscribe communication typically employed by message queue and message broker communication systems (e.g., Advanced Message Queuing Protocol (AMQP), Apache Active MQ, ZeroMQ, etc.). FIG. 5B illustratively shows three "data" match list entries 508 (i.e., with "data" match bits) which are ready to read via a pop operation and three "free" match list entries 510 which represent buffers that can accept incoming messages via a push operation. The illustrative "data" match list entries 508 includes a first "data" match list entry, designated as "data" match list entry (1) 508a, a second "data" match list entry, designated as "data" match list entry (2) 508b, and a third "data" match list entry, designated as "data" match list entry (3) 508c. Similarly, the illustrative "free" match list entries 510 includes a first "free" match list entry, designated as "free" match list entry (1) 510a, a second "free" match list entry, designated as "free" match list entry (2) 508b, and a third "free" match list entry, designated as "free" match list entry (3) 510c.

On a push operation, as illustratively shown in FIG. 5C, one of the "free" match list entries (i.e., match list entry 510a of FIG. 5B) is "consumed" and moved to the data match list entries 508 (i.e., the "match" bits associated with the match list entry are updated) which is now illustratively shown as "data" match list entry 508d. To do so, as described previously, information associated with an incoming message is received at the HFI 120. The HFI 120 is configured to identify the corresponding table entry 504 and match the incoming message to the first available "free" match list entry 510 (e.g., the "free" match list entry (4) 510a of FIG. 5B) with the MDL flag set. The match causes the associated "free" match list entry 510 to be disabled by enabling the MDL flag associated with that "free" match list entry 510. As such, the message will be appended in order to the queue and a subsequent pop operation will be able to retrieve this data, or receive a response indicating the table entry (e.g., the table entry (2) 504b) is not ready (i.e., disabled). The match event triggers an append operation which appends data associated with the received message to the buffer of the now "data" match list entry 508 (e.g., the "data" match list entry (4) 508d of FIG. 5C). Subsequently, the TLE operation is triggered, which re-enables the table entry (e.g., the table entry (2) 504b) by disabling the MDL flag associated with that match list entry.

EXAMPLES

Illustrative examples of the technologies disclosed herein are provided below. An embodiment of the technologies may include any one or more, and any combination of, the examples described below.

Example 1 includes a compute device for synchronizing triggered operations, the compute device comprising a compute engine; and a host fabric interface (HFI) to receive, by a command processing unit of the HFI, an operation execution command associated with a triggered operation that has been fired; determine, by the command processing unit, whether the operation execution command includes an instruction to update a table entry of a table managed by the HFI; issue, in response to a determination that the operation execution command includes the instruction to update the table entry, a triggered list enable (TLE) operation and a triggered list disable (TLD) operation to a table manager of the HFI, wherein each of the issued TLE and TLD operations includes a table entry identifier; identify, by the table manager, the table entry based on the table entry identifier; disable, by the table manager and in response to the TLD operation having been triggered, the identified table entry; execute, by the command processing unit and subsequent to the TLD operation having been triggered, one or more command operations associated with the received operation execution command; and enable, by the table manager and in response to the TLE operation having been triggered, the identified table entry.

Example 2 includes the subject matter of Example 1, and wherein the HFI is further to receive, by an ingress manager of the HFI, a message for processing from another compute device, wherein the message includes the table entry identifier and a set of match bits; identify, by the table manager, the table entry based on the table entry identifier; determine, by the table manager, whether the identified table entry is enabled; identify, by the table manager and in response to a determination that the identified table entry is enabled, a matching match list entry of one or more match list entries of the identified table entry based on the set of match bits, wherein each of the one or more match list entries includes a match-and-disable (MDL) flag; determine, by the table manager, a state of the MDL flag associated with the identified matching match list entry, wherein the state of the MDL flag indicates whether to disable the identified table entry upon the identification of the matching match list entry; disable, by the table manager and in response to a determination that the state of the MDL flag indicates to disable the identified table entry upon the identification of the matching match list entry, the identified table entry; and process, by the command processing unit, the received message.

Example 3 includes the subject matter of any of Examples 1 and 2, and wherein the HFI is further to transmit, in response to a determination that the identified table entry is disabled, a receiver-not-ready (RNR) response to a source of the received operation execution command.

Example 4 includes the subject matter of any of Examples 1-3, and wherein to identify the matching match list entry of the one or more match list entries comprises to compare the set of match bits of the received message to a set of match bits of the each of the one or more match list entries of the identified table entry.

Example 5 includes the subject matter of any of Examples 1-4, and wherein the HFI is further to increment, subsequent to having enabled the identified table entry, an event counter associated with the fired triggered operation.

Example 6 includes the subject matter of any of Examples 1-5, and wherein to determine whether the operation execution command includes the instruction to update the identified table entry of the table comprises to determine whether the operation execution command includes the instruction to update a matching list entry of the identified table entry.

Example 7 includes the subject matter of any of Examples 1-6, and wherein to issue the TLE operation and the TLD operation to the table manager comprises to enqueue each of the TLE operation and the TLD operation into a queue of pending triggered operations.

Example 8 includes one or more machine-readable storage media comprising a plurality of instructions stored thereon that, in response to being executed, cause a compute device to receive, by a command processing unit of a host fabric interface (HFI) of the compute device, an operation execution command associated with a triggered operation that has been fired; determine, by the command processing unit, whether the operation execution command includes an instruction to update a table entry of a table managed by the HFI; issue, in response to a determination that the operation execution command includes the instruction to update the table entry, a triggered list enable (TLE) operation and a triggered list disable (TLD) operation to a table manager of the HFI, wherein each of the issued TLE and TLD operations includes a table entry identifier; identify, by the table manager, the table entry based on the table entry identifier; disable, by the table manager and in response to the TLD operation having been triggered, the identified table entry; execute, by the command processing unit and subsequent to the TLD operation having been triggered, one or more command operations associated with the received operation execution command; and enable, by the table manager and in response to the TLE operation having been triggered, the identified table entry.

Example 9 includes the subject matter of Example 8, and wherein the plurality of instructions further cause the compute device to receive, by an ingress manager of the HFI, a message for processing from another compute device, wherein the message includes the table entry identifier and a set of match bits; identify, by the table manager, the table entry based on the table entry identifier; determine, by the table manager, whether the identified table entry is enabled; identify, by the table manager and in response to a determination that the identified table entry is enabled, a matching match list entry of one or more match list entries of the identified table entry based on the set of match bits, wherein each of the one or more match list entries includes a match-and-disable (MDL) flag; determine, by the table manager, a state of the MDL flag associated with the identified matching match list entry, wherein the state of the MDL flag indicates whether to disable the identified table entry upon the identification of the matching match list entry; disable, by the table manager and in response to a determination that the state of the MDL flag indicates to disable the identified table entry upon the identification of the matching match list entry, the identified table entry; and process, by the command processing unit, the received message.

Example 10 includes the subject matter of any of Examples 8 and 9, and wherein the plurality of instructions further cause the compute device to transmit, in response to a determination that the identified table entry is disabled, a receiver-not-ready (RNR) response to a source of the received operation execution command.

Example 11 includes the subject matter of any of Examples 8-10, and wherein to identify the matching match list entry of the one or more match list entries comprises to compare the set of match bits of the received message to a set of match bits of the each of the one or more match list entries of the identified table entry.

Example 12 includes the subject matter of any of Examples 8-11, and wherein the plurality of instructions further cause the compute device to increment, subsequent to having enabled the identified table entry, an event counter associated with the fired triggered operation.

Example 13 includes the subject matter of any of Examples 8-12, and wherein to determine whether the operation execution command includes the instruction to update the identified table entry of the table comprises to determine whether the operation execution command includes the instruction to update a matching list entry of the identified table entry.

Example 14 includes the subject matter of any of Examples 8-13, and wherein to issue the TLE operation and the TLD operation to the table manager comprises to enqueue each of the TLE operation and the TLD operation into a queue of pending triggered operations.

Example 15 includes a compute device for synchronizing triggered operations, the compute device comprising circuitry for receiving an operation execution command associated with a triggered operation that has been fired; means for determining whether the operation execution command includes an instruction to update a table entry of a table managed by the HFI; means for issuing, in response to a determination that the operation execution command includes the instruction to update the table entry, a triggered list enable (TLE) operation and a triggered list disable (TLD) operation to a table manager of the HFI, wherein each of the issued TLE and TLD operations includes a table entry identifier; circuitry for identifying the table entry based on the table entry identifier; means for disabling, in response to the TLD operation having been triggered, the identified table entry; circuitry for executing, subsequent to the TLD operation having been triggered, one or more command operations associated with the received operation execution command; and circuitry for enabling, in response to the TLE operation having been triggered, the identified table entry.

Example 16 includes the subject matter of Example 15, and further including circuitry for receiving a message for processing from another compute device, wherein the message includes the table entry identifier and a set of match bits; circuitry for identifying the table entry based on the table entry identifier; circuitry for determining whether the identified table entry is enabled; means for identifying, in response to a determination that the identified table entry is enabled, a matching match list entry of one or more match list entries of the identified table entry based on the set of match bits, wherein each of the one or more match list entries includes a match-and-disable (MDL) flag; means for determining a state of the MDL flag associated with the identified matching match list entry, wherein the state of the MDL flag indicates whether to disable the identified table entry upon the identification of the matching match list entry; circuitry for disabling, in response to a determination that the state of the MDL flag indicates to disable the identified table entry upon the identification of the matching match list entry, the identified table entry; and circuitry for processing the received message.

Example 17 includes the subject matter of any of Examples 15 and 16, and further including circuitry for transmitting, in response to a determination that the identified table entry is disabled, a receiver-not-ready (RNR) response to a source of the received operation execution command.

Example 18 includes the subject matter of any of Examples 15-17, and wherein the means for identifying the matching match list entry of the one or more match list entries comprises means for comparing the set of match bits of the received message to a set of match bits of the each of the one or more match list entries of the identified table entry.

Example 19 includes the subject matter of any of Examples 15-18, and further including circuitry for incrementing, subsequent to having enabled the identified table entry, an event counter associated with the fired triggered operation.

Example 20 includes the subject matter of any of Examples 15-19, and wherein the means for determining whether the operation execution command includes the instruction to update the identified table entry of the table comprises to determine whether the operation execution command includes the instruction to update a matching list entry of the identified table entry.

Example 21 includes the subject matter of any of Examples 15-20, and wherein the means for issuing the TLE operation and the TLD operation to the table manager comprises means for enqueuing each of the TLE operation and the TLD operation into a queue of pending triggered operations.

The invention claimed is:

1. A compute device for synchronizing triggered operations, the compute device comprising:
a compute engine; and
a host fabric interface (HFI) to:
receive, by a command processing unit of the HFI, an operation execution command associated with a triggered operation that has been fired;
determine, by the command processing unit, whether the operation execution command includes an instruction to update a table entry of a table managed by the HFI;
issue, in response to a determination that the operation execution command includes the instruction to update the table entry, a triggered list enable (TLE) operation and a triggered list disable (TLD) operation to a table manager of the HFI, wherein each of the issued TLE and TLD operations includes a table entry identifier;
identify, by the table manager, the table entry based on the table entry identifier;
disable, by the table manager and in response to the TLD operation having been triggered, the identified table entry;
execute, subsequent to the TLD operation having been triggered, one or more command operations associated with the received operation execution command; and
enable, by the table manager and in response to the TLE operation having been triggered, the identified table entry.

2. The compute device of claim 1, wherein the HFI is further to:
receive, by an ingress manager of the HFI, a message for processing from another compute device, wherein the message includes the table entry identifier and a set of match bits;
identify, by the table manager, the table entry based on the table entry identifier;
determine, by the table manager, whether the identified table entry is enabled;
identify, by the table manager and in response to a determination that the identified table entry is enabled, a matching match list entry of one or more match list entries of the identified table entry based on the set of match bits, wherein each of the one or more match list entries includes a match-and-disable (MDL) flag;

determine, by the table manager, a state of the MDL flag associated with the identified matching match list entry, wherein the state of the MDL flag indicates whether to disable the identified table entry upon the identification of the matching match list entry;

disable, by the table manager and in response to a determination that the state of the MDL flag indicates to disable the identified table entry upon the identification of the matching match list entry, the identified table entry; and process the received message.

3. The compute device of claim 2, wherein the HFI is further to transmit, in response to a determination that the identified table entry is disabled, a receiver-not-ready (RNR) response to a source of the received operation execution command.

4. The compute device of claim 2, wherein to identify the matching match list entry of the one or more match list entries comprises to compare the set of match bits of the received message to a set of match bits of the each of the one or more match list entries of the identified table entry.

5. The compute device of claim 1, wherein the HFI is further to increment, subsequent to having enabled the identified table entry, an event counter associated with the fired triggered operation.

6. The compute device of claim 1, wherein to determine whether the operation execution command includes the instruction to update the identified table entry of the table comprises to determine whether the operation execution command includes the instruction to update a matching list entry of the identified table entry.

7. The compute device of claim 1, wherein to issue the TLE operation and the TLD operation to the table manager comprises to enqueue each of the TLE operation and the TLD operation into a queue of pending triggered operations.

8. One or more non-transitory machine-readable storage media comprising a plurality of instructions stored thereon that, in response to being executed, cause a compute device to:

receive, by a command processing unit of a host fabric interface (HFI) of the compute device, an operation execution command associated with a triggered operation that has been fired;

determine, by the command processing unit, whether the operation execution command includes an instruction to update a table entry of a table managed by the HFI;

issue, in response to a determination that the operation execution command includes the instruction to update the table entry, a triggered list enable (TLE) operation and a triggered list disable (TLD) operation to a table manager of the HFI, wherein each of the issued TLE and TLD operations includes a table entry identifier;

identify, by the table manager, the table entry based on the table entry identifier;

disable, by the table manager and in response to the TLD operation having been triggered, the identified table entry;

execute, by the command processing unit and subsequent to the TLD operation having been triggered, one or more command operations associated with the received operation execution command; and enable, by the table manager and in response to the TLE operation having been triggered, the identified table entry.

9. The one or more non-transitory machine-readable storage media of claim 8, wherein the plurality of instructions further cause the compute device to:

receive, by an ingress manager of the HFI, a message for processing from another compute device, wherein the message includes the table entry identifier and a set of match bits;

identify, by the table manager, the table entry based on the table entry identifier;

determine, by the table manager, whether the identified table entry is enabled;

identify, by the table manager and in response to a determination that the identified table entry is enabled, a matching match list entry of one or more match list entries of the identified table entry based on the set of match bits, wherein each of the one or more match list entries includes a match-and-disable (MDL) flag;

determine, by the table manager, a state of the MDL flag associated with the identified matching match list entry, wherein the state of the MDL flag indicates whether to disable the identified table entry upon the identification of the matching match list entry;

disable, by the table manager and in response to a determination that the state of the MDL flag indicates to disable the identified table entry upon the identification of the matching match list entry, the identified table entry; and process, by the command processing unit, the received message.

10. The one or more non-transitory machine-readable storage media of claim 9, wherein the plurality of instructions further cause the compute device to transmit, in response to a determination that the identified table entry is disabled, a receiver-not-ready (RNR) response to a source of the received operation execution command.

11. The one or more non-transitory machine-readable storage media of claim 9, wherein to identify the matching match list entry of the one or more match list entries comprises to compare the set of match bits of the received message to a set of match bits of the each of the one or more match list entries of the identified table entry.

12. The one or more non-transitory machine-readable storage media of claim 8, wherein the plurality of instructions further cause the compute device to increment, subsequent to having enabled the identified table entry, an event counter associated with the fired triggered operation.

13. The one or more non-transitory machine-readable storage media of claim 8, wherein to determine whether the operation execution command includes the instruction to update the identified table entry of the table comprises to determine whether the operation execution command includes the instruction to update a matching list entry of the identified table entry.

14. The one or more non-transitory machine-readable storage media of claim 8, wherein to issue the TLE operation and the TLD operation to the table manager comprises to enqueue each of the TLE operation and the TLD operation into a queue of pending triggered operations.

15. A compute device for synchronizing triggered operations, the compute device comprising:

circuitry for receiving an operation execution command associated with a triggered operation that has been fired;

means for determining whether the operation execution command includes an instruction to update a table entry of a table managed by the a host fabric interface (HFI);

means for issuing, in response to a determination that the operation execution command includes the instruction to update the table entry, a triggered list enable (TLE) operation and a triggered list disable (TLD) operation to a table manager of the HFI, wherein each of the issued TLE and TLD operations includes a table entry identifier;

circuitry for identifying the table entry based on the table entry identifier;

means for disabling, in response to the TLD operation having been triggered, the identified table entry;

circuitry for executing, subsequent to the TLD operation having been triggered, one or more command operations associated with the received operation execution command; and circuitry for enabling, in response to the TLE operation having been triggered, the identified table entry.

16. The compute device of claim 15, further comprising:

circuitry for receiving a message for processing from another compute device, wherein the message includes the table entry identifier and a set of match bits;

circuitry for identifying the table entry based on the table entry identifier;

circuitry for determining whether the identified table entry is enabled;

means for identifying, in response to a determination that the identified table entry is enabled, a matching match list entry of one or more match list entries of the identified table entry based on the set of match bits, wherein each of the one or more match list entries includes a match-and-disable (MDL) flag;

means for determining a state of the MDL flag associated with the identified matching match list entry, wherein the state of the MDL flag indicates whether to disable the identified table entry upon the identification of the matching match list entry;

circuitry for disabling, in response to a determination that the state of the MDL flag indicates to disable the identified table entry upon the identification of the matching match list entry, the identified table entry; and circuitry for processing the received message.

17. The compute device of claim 16, further comprising circuitry for transmitting, in response to a determination that the identified table entry is disabled, a receiver-not-ready (RNR) response to a source of the received operation execution command.

18. The compute device of claim 16, wherein the means for identifying the matching match list entry of the one or more match list entries comprises means for comparing the set of match bits of the received message to a set of match bits of the each of the one or more match list entries of the identified table entry.

19. The compute device of claim 15, further comprising circuitry for incrementing, subsequent to having enabled the identified table entry, an event counter associated with the fired triggered operation.

20. The compute device of claim 15, wherein the means for determining whether the operation execution command includes the instruction to update the identified table entry of the table comprises to determine whether the operation execution command includes the instruction to update a matching list entry of the identified table entry.

21. The compute device of claim 15, wherein the means for issuing the TLE operation and the TLD operation to the table manager comprises means for enqueuing each of the TLE operation and the TLD operation into a queue of pending triggered operations.

* * * * *